United States Patent
Willenegger

(10) Patent No.: US 7,643,515 B2
(45) Date of Patent: Jan. 5, 2010

(54) METHOD AND APPARATUS FOR DERIVING TRANSMISSION TIMING OF A DOWNLINK CONTROL CHANNEL IN SUPPORT OF ENHANCED UPLINK OPERATION

(75) Inventor: Serge D. Willenegger, Onnens (CH)

(73) Assignee: QUALCOMM Incorporated

( * ) Notice: Subject to any disclaimer, the term of this patent is extended or adjusted under 35 U.S.C. 154(b) by 622 days.

(21) Appl. No.: 11/266,810

(22) Filed: Nov. 3, 2005

(65) Prior Publication Data

US 2006/0120408 A1 Jun. 8, 2006

Related U.S. Application Data

(60) Provisional application No. 60/627,048, filed on Nov. 10, 2004.

(51) Int. Cl.
*H04J 3/06* (2006.01)
(52) U.S. Cl. .................. 370/508; 370/252; 370/342; 370/349; 370/350; 370/479
(58) Field of Classification Search ................. 370/230, 370/235, 236, 236.1, 236.2, 246, 247, 250, 370/251, 241.1, 248, 320, 324, 328, 335, 370/342, 350, 348, 349, 441, 479, 503, 508, 370/509, 516, 519, 252
See application file for complete search history.

(56) References Cited

U.S. PATENT DOCUMENTS 5,828,659 A 10/1998 Teder et al.

| | | | |
|---|---|---|---|
| 2002/0009129 A1* | 1/2002 | Choi et al. | 375/149 |
| 2005/0068990 A1* | 3/2005 | Liu | 370/516 |
| 2005/0117547 A1* | 6/2005 | Lu | 370/335 |

FOREIGN PATENT DOCUMENTS

EP 1286491 A 2/2003

(Continued)

OTHER PUBLICATIONS

TIA/EIA Standard; "Mobile Station-Base Station Compatibility Standard for Wideband Spread Spectrum Cellular Systems," Telecommunications Industry Association; TIA/EIA-95-B; Mar. 1999.

(Continued)

*Primary Examiner*—Ricky Ngo
*Assistant Examiner*—Wei-po Kao
(74) *Attorney, Agent, or Firm*—D. Scott Juneau; Won Tau C. Kim

(57) ABSTRACT

A remote station for wireless communication is disclosed. The remote station includes a transmitter configured to transmit packet data on an uplink channel and a receiver. The receiver is configured to receive a first frame having a downlink dedicated physical channel, the first frame being defined by a first propagation delay and a first time offset relative to a reference timing based on a common control physical channel and receive a second frame having a downlink dedicated control channel responsive to the packet data received by a base station, a beginning of the second frame being defined by a second propagation delay and a second time offset from the reference timing, the second time offset being a function of the first time offset.

19 Claims, 4 Drawing Sheets

FOREIGN PATENT DOCUMENTS

| | | |
|---|---|---|
| RU | 2189072 | 9/2002 |
| RU | 2195076 | 12/2002 |
| RU | 2149518 | 5/2004 |
| WO | WO 98057450 | 12/1998 |
| WO | 0191338 A | 11/2001 |
| WO | WO 01089254 | 11/2001 |
| WO | WO 02065664 | 8/2002 |
| WO | WO 02096144 | 11/2002 |
| WO | 2004049648 | 6/2004 |

OTHER PUBLICATIONS

"3rd Generation Partnership Project; Technical Specification Group Radio Access Network; Physical channels and mapping of transport channels onto physical channels (FDD)(Release 6)," 3GPP TS 25.211 version 6.1.0 (Jun. 2004).

"3rd Generation Partnership Project; Technical Specification Group Radio Access Network; Multiplexing and channel coding (FDD)(Release 6),""3GPP TS 25.21 2 version 6.2.0 (Jun. 2004)".

"3rd Generation Partnership Project; Technical Specification Group Radio Access Network; Spreading and modulation (FDD)(Release 6),""3GPP TS 25.213 version 6.0.0 (Dec. 2003)".

"3rd Generation Partnership Project; Technical Specification Group Radio Access Network; Physical layer procedures (FDD)(Release 6),""3GPP TS 25.214 version 6.2.0 (Jun. 2004)".

3rd Generation Partnership Project 2 "3GPP2" Physical Layer Standard for cdma2000 Spread Spectrum Systems, Revision D; TR-45.5; 3GPP2 C.S0002-D, Version 2.0 (Sep. 2005).

International Search Report—PCT/US05/040367, International Search Authority—European Patent Office, Mar. 28, 2006.

Written Opinion-PCT/US2005/040367, International Searching Authority-European Patent Office-Mar. 28, 2006.

International Preliminary Report on Patentability-PCT/US2005/040367. International Bureau of WIPO-Geneva, Switzerland-May 15, 2007.

* cited by examiner

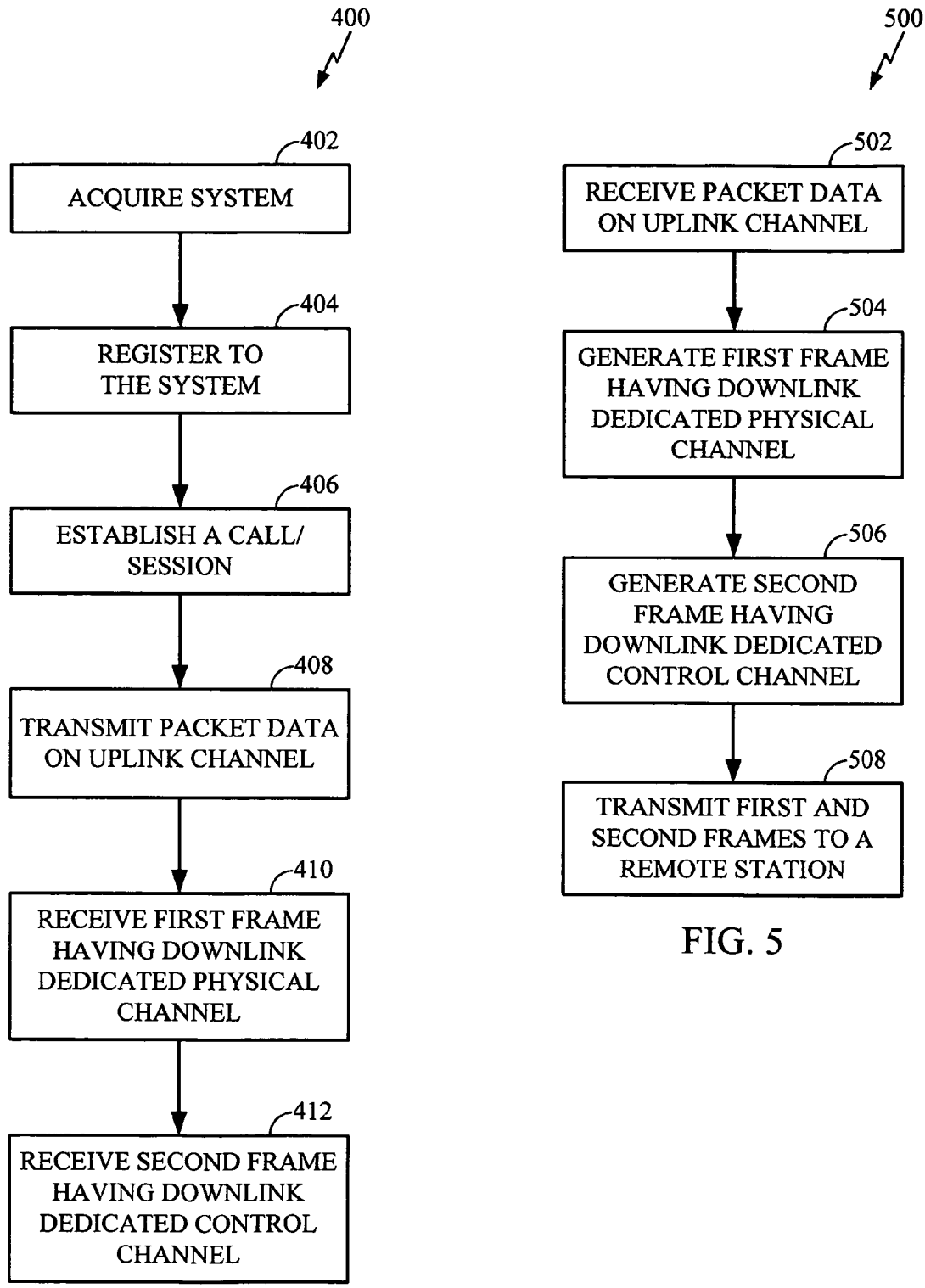

METHOD AND APPARATUS FOR DERIVING TRANSMISSION TIMING OF A DOWNLINK CONTROL CHANNEL IN SUPPORT OF ENHANCED UPLINK OPERATION

CLAIM OF PRIORITY UNDER 35 U.S.C. §119

The present Application for patent claims priority to Provisional Application No. 60/627,048 entitled "Method and Apparatus For Deriving Transmission Timing of Downlink Control Channels in Support of Enhanced Uplink Operation" filed Nov. 10, 2004, and assigned to the assignee hereof and hereby expressly incorporated by reference herein.

BACKGROUND

1. Field

The present invention relates generally to wireless communication, and more specifically to cellular wireless communication.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems, such as a wireless communication system, designed to allow multiple users to access a common communications medium have been developed for such cellular systems. These modern communication systems may be based on multiple access techniques such as code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless communication systems have been established including, e.g., Advanced Mobile Phone Service (AMPS), Global System for Mobile communication (GSM), and other wireless systems.

In FDMA systems, the total frequency spectrum is divided into a number of smaller sub-bands and each user is given its own sub-band to access the communication medium. Alternatively, in TDMA systems, the total frequency spectrum is divided into a number of smaller sub-bands, each sub-band is shared among a number of users, and each user is allowed to transmit in predetermined time slots using that sub-band. A CDMA system provides potential advantages over other types of systems, including increased system capacity. In CDMA systems, each user is given the entire frequency spectrum for all of the time, but distinguishes its transmission through the use of a unique code.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and (3) the standard offered by a consortium named "3rd Generation Partnership Project 2" (3GPP2) and embodied in "TR-45.5 Physical Layer Standard for cdma2000 Spread Spectrum Systems" (the IS-2000 standard).

In the above named CDMA communication systems and standards, the available spectrum is shared simultaneously among a number of users, and suitable techniques are available to provide services, such as voice and data services.

Systems have been proposed to provide high speed data services both in the downlink and uplink directions. One such uplink high speed data service is known as EUL (Enhanced Uplink) in which a remote station sends high speed packet data to a base station on uplink channels. The base station sends back ACK or NAK signals to the remote station based on its ability to successfully decode the received packet data. For example, an ACK signal is transmitted to the remote station if the received packet data was decode successfully or the NAK signal is transmitted to the remote station if the received packet data was not successfully decoded or if the packet data was never received. If a NAK signal is received by the remote station, then the remote station may retransmit the packet data.

What is needed is a scheme to minimize the round trip processing time related to the transmission of packet data to a base station on an uplink channel and its acknowledgement by the base station to the remote station.

SUMMARY

In one aspect, a remote station for wireless communication is disclosed. The remote station includes a transmitter configured to transmit packet data on an uplink channel and a receiver. The receiver is configured to receive a first frame having a downlink dedicated physical channel, the first frame being defined by a first propagation delay and a first time offset relative to a reference timing based on a common control physical channel and receive a second frame having a downlink dedicated control channel responsive to the packet data received by a base station, a beginning of the second frame being defined by a second propagation delay and a second time offset from the reference timing, the second time offset being a function of the first time offset.

In another aspect, an apparatus for a wireless communication system is disclosed. The apparatus includes a control processor configured to receive packet data on an uplink channel from a remote station, generate a first frame having a downlink dedicated physical channel, the first frame being defined by a first time offset relative to a reference timing based on a common control physical channel, and generate a second frame having a downlink dedicated control channel responsive to the received packet data, a beginning of the second frame being defined by a second time offset from the reference timing, the second time offset being a function of the first time offset.

In yet another aspect, a method of operating a remote station for wireless communication is disclosed. The method includes transmitting packet data on an uplink channel, receiving a first frame having a downlink dedicated physical channel, the first frame being defined by a first propagation delay and a first time offset relative to a reference timing based on a common control physical channel, and receiving a second frame having a downlink dedicated control channel responsive to the packet data received by a base station, a beginning of the second frame being defined by a second propagation delay and a second time offset from the reference timing, the second time offset being a function of the first time offset.

In yet another aspect, a method of operating an apparatus for a wireless communication system is disclosed. The method includes receiving packet data on an uplink channel from a remote station, generating a first frame having a downlink dedicated physical channel, the first frame being defined by a first time offset relative to a reference timing based on a common control physical channel, and generating a second frame having a downlink dedicated control channel responsive to the received packet data, a beginning of the second frame being defined by a second time offset from the reference timing, the second time offset being a function of the first time offset.

In yet another aspect, a machine-readable medium comprising instructions, the instructions when executed by the machine, cause the machine to perform operations is disclosed. The operations include transmitting packet data on an uplink channel, receiving a first frame having a downlink dedicated physical channel, the first frame being defined by a first propagation delay and a first time offset relative to a reference timing based on a common control physical channel, and receiving a second frame having a downlink dedicated control channel responsive to the packet data received by a base station, a beginning of the second frame being defined by a second propagation delay and a second time offset from the reference timing, the second time offset being a function of the first time offset.

In yet another aspect, a remote station for wireless communication is disclosed. The remote station includes means for transmitting packet data on an uplink channel, means for receiving a first frame having a downlink dedicated physical channel, the first frame being defined by a first propagation delay and a first time offset relative to a reference timing based on a common control physical channel, and means for receiving a second frame having a downlink dedicated control channel responsive to the packet data received by a base station, a beginning of the second frame being defined by a second propagation delay and a second time offset from the reference timing, the second time offset being a function of the first time offset.

In yet another aspect, an apparatus for a wireless communication system is disclosed. The apparatus includes means for receiving packet data on an uplink channel from a remote station, means for generating a first frame having a downlink dedicated physical channel, the first frame being defined by a first time offset relative to a reference timing based on a common control physical channel, and means for generating a second frame having a downlink dedicated control channel responsive to the received packet data, a beginning of the second frame being defined by a second time offset from the reference timing, the second time offset being a function of the first time offset.

In yet another aspect, a machine-readable medium comprising instructions, the instructions when executed by the machine, cause the machine to perform operations is disclosed. The operations include receiving packet data on an uplink channel from a remote station, generating a first frame having a downlink dedicated physical channel, the first frame being defined by a first time offset relative to a reference timing based on a common control physical channel, and generating a second frame having a downlink dedicated control channel responsive to the received packet data, a beginning of the second frame being defined by a second time offset from the reference timing, the second time offset being a function of the first time offset.

BRIEF DESCRIPTION OF THE DRAWINGS

FIG. 4 is a flow diagram of a process which may be implemented by a remote station according to an embodiment of the present invention;

FIG. 5 is a flow diagram of a process which may be implemented by a base station according to an embodiment of the present invention.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as an access terminal (AT), user equipment (UE) or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. An access network transports data packets between multiple remote stations. The access network may be further connected to additional networks outside the access network, such as a corporate intranet or the Internet, and may transport data packets between each remote station and such outside networks. A remote station that has established an active traffic channel connection with one or more base stations is called an active remote station, and is said to be in a traffic state. A remote station that is in the process of establishing an active traffic channel connection with one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals to the base station is called an uplink, also known as a reverse link. The communication link through which a base station sends signals to a remote station is called a downlink, also known as a forward link.

Figure 1:
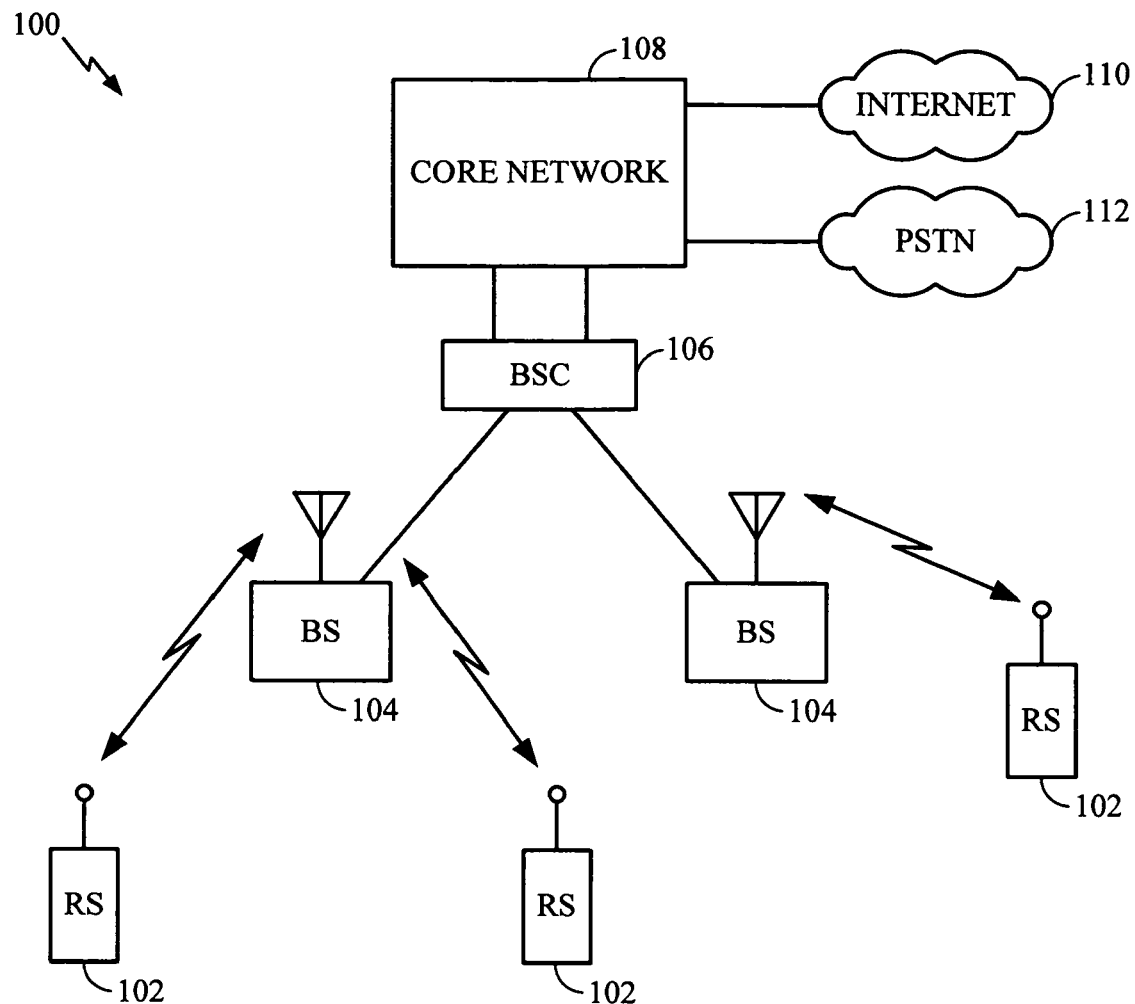
FIG. 1 is an example of a wireless communication system.

With reference to FIG. 1, an exemplary wireless communication system 100 includes one or more remote stations (RS) 102, one or more base stations (BS) 104, one or more base station controllers (BSC) 106, and a core network 108. Core network may be connected to an Internet 110 and a Public Switched Telephone Network (PSTN) 112 via suitable backhauls. Wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Figure 2:
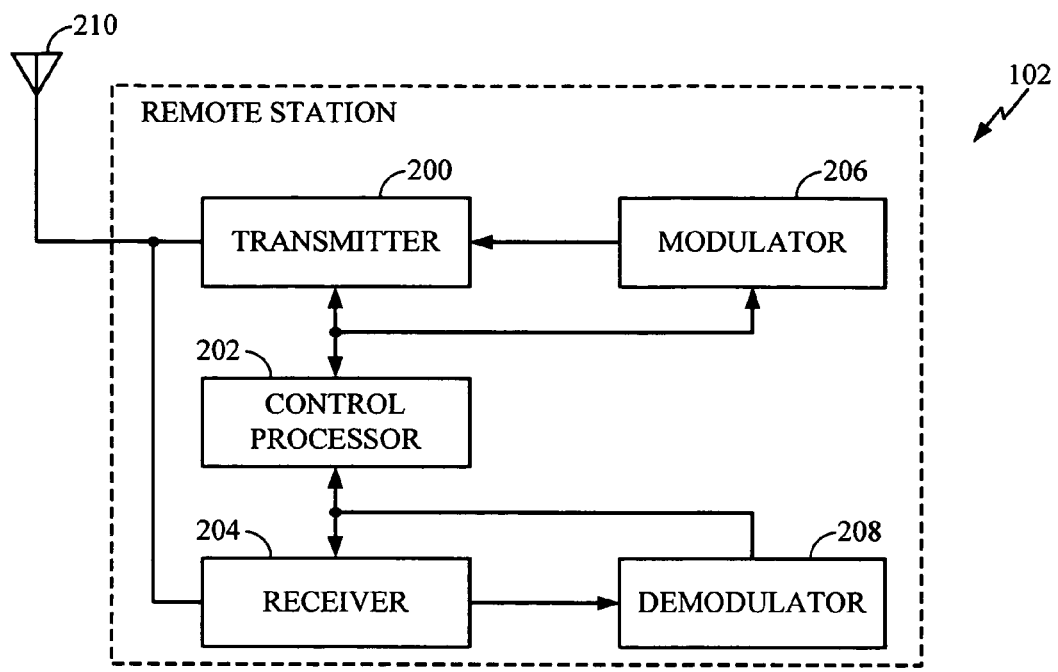
FIG. 2 is a block diagram of a remote station according to an embodiment of the present invention.
Figure 6:
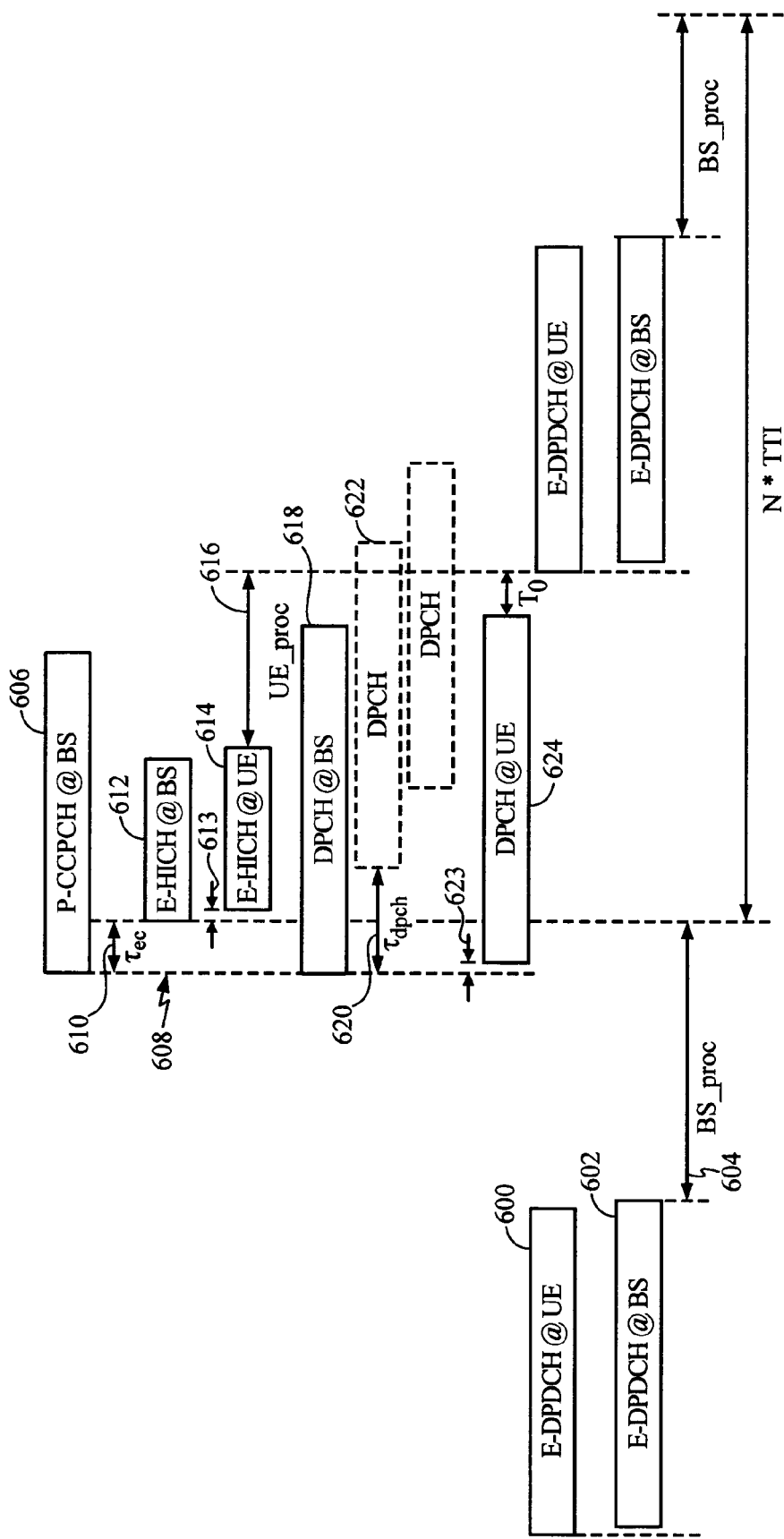
FIG. 6 is a diagram of an exemplary relative timing of the downlink and uplink physical channels in accordance with an embodiment of the present invention.

With reference to FIGS. 2 and 6, in one embodiment, remote station 102 includes transmitter 200 configured to transmit packet data 600 on an uplink channel and receiver 204. Receiver 204 is configured to receive a first frame 624 having a downlink dedicated physical channel, first frame 624 being defined by a first propagation delay 623 and a first time offset 620 relative to a reference timing 608 based on a common control physical channel 606 and receive a second frame 614 having a downlink dedicated control channel responsive to the packet data received by a base station, a beginning of the second frame 614 being defined by a second propagation delay 613 and a second time offset 610 from reference timing 608, second time offset 610 being a function of first time offset 620; In one embodiment, a downlink dedicated physical channel (DPCH) included in first frame 624 may be a downlink Dedicated Physical Data Channel (DP-DCH), common control physical channel 606 may be a Primary Common Control Physical Channel (P-CCPCH), and a downlink dedicated control channel included in second frame 614 may be an E-DCH (Enhanced Dedicated Channel) Hybrid ARQ Indicator Channel (E-HICH), all of which are shown in FIG. 6. In an alternative embodiment, common control physical channel 606 may be a Common Pilot Channel (CPICH) and a downlink dedicated control channel included in second frame 614 may be an E-DCH Relative Grant Channel (E-RGCH). First and second propagation delays 623, 613 may generally be the same delay.

Continuing with FIG. 2, remote station 102 includes a control processor 202, a modulator 206, a demodulator 208, and an antenna 210, the functions of which are known in the art.

Continuing with FIG. 6, in one embodiment as shown, first time offset 620 may be $\tau_{dpch}$ and second time offset 610 may be $\tau_{ec}$.

Figure 3:
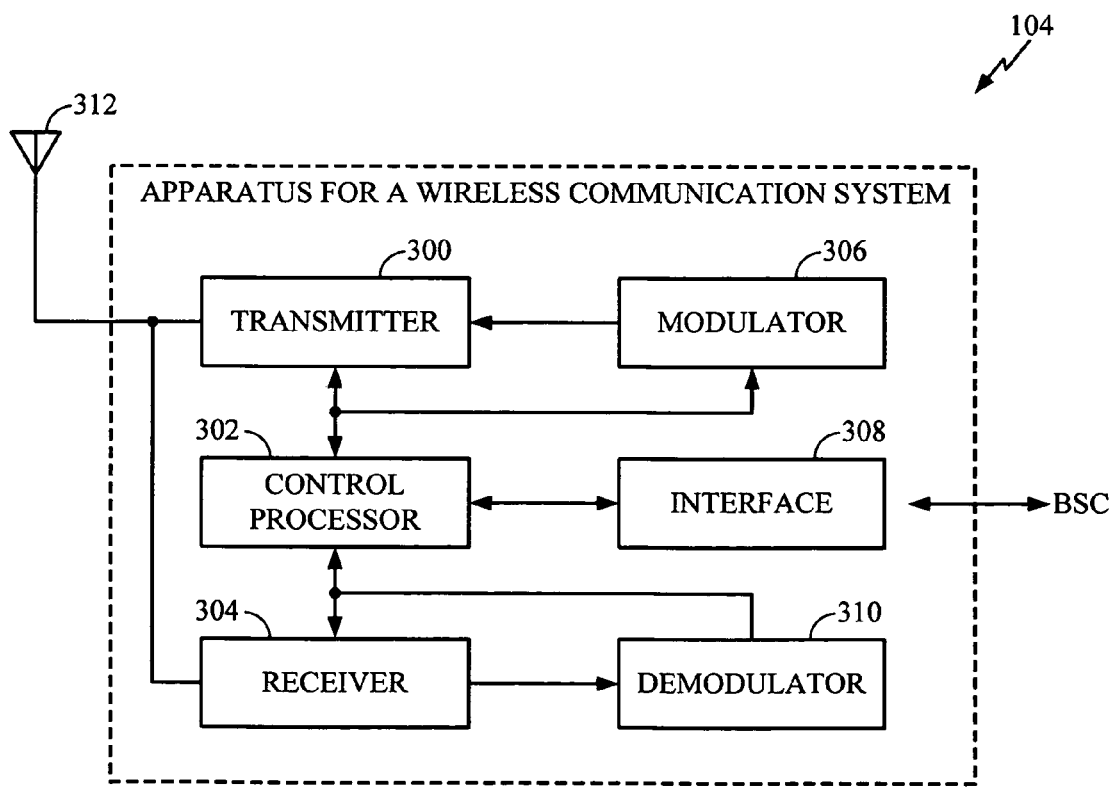
FIG. 3 is a block diagram of a base station according to an embodiment of the present invention.

With reference to FIGS. 3 and 6, in one embodiment, an apparatus 104 for a wireless communication system includes a control processor 302 configured to receive packet data 602 on an uplink channel from a remote station, generate a first frame 618 having a downlink dedicated physical channel, first frame 618 being defined by a first time offset 620 relative to a reference timing 608 based on a common control physical channel 606, and generate a second frame 612 having a downlink dedicated control channel responsive to the received packet data, a beginning of second frame 612 being defined by a second time offset 610 from reference timing 608, second time offset 610 being a function of first time offset 620.

In one embodiment, a downlink dedicated physical channel (DPCH) included in first frame 618 may be a downlink Dedicated Physical Data Channel (DPDCH), common control physical channel 606 may be a Primary Common Control Physical Channel (P-CCPCH), and a downlink dedicated control channel included in second frame 612 may be an E-DCH (Enhanced Dedicated Channel) Hybrid ARQ Indicator Channel (E-HICH), all of which are shown in FIG. 6. In an alternative embodiment, common control physical channel 606 may be a Common Pilot Channel (CPICH) and a downlink dedicated control channel included in second frame 612 may be an E-DCH Relative Grant Channel (E-RGCH).

Continuing with FIG. 3, apparatus 104 includes a modulator 306, an interface 308 for communicating with a BSC, such as BSC 106 shown in FIG. 1, a transmitter 300, a receiver 304, a demodulator 310, and an antenna 312, the functions of which are known in the art. In one embodiment, apparatus 104 is a base station. In an alternative embodiment, apparatus 104 is a base station controller in which case interface 308 communicates with a core network and antenna 312 may be replaced with a wireline connected to a base station. In one embodiment, the transmitter and the receiver in either the remote station or the apparatus for a wireless communication system may be separate components as shown. In another embodiment, the transmitter and receiver in either the remote station or the apparatus for a wireless communication may be a single component, commonly referred to as a "transceiver."

With reference to FIG. 4, a flow diagram of a method or process 400 of operating a remote station for wireless communication in accordance with one embodiment of the present invention is shown in which process 400 may be implemented by a control processor in conjunction with other components of a remote station, such as control processor 202 of remote station 102, shown in FIG. 2. At 402, a remote station, such as remote station 102 (see FIG. 2), acquires the system. At 404, remote station 102 registers to the system and establishes a call/session at 406. At 406, remote station 102 transmits packet data on an uplink channel and at 410 receives a first frame having a downlink dedicated physical channel, the first frame being defined by a first propagation delay and a first time offset relative to a reference timing based on a common control physical channel. At 412, remote station 102 receives a second frame having a downlink dedicated control channel responsive to the packet data received by a base station, a beginning of the second frame being defined by a second propagation delay and a second time offset from the reference timing, the second time offset being a function of the first time offset.

With reference to FIG. 5, a flow diagram of a method or process 500 of operating an apparatus for a wireless communication system in accordance with one embodiment of the present invention is shown in which process 500 may be implemented by control processor 302 (see FIG. 3) in conjunction with other components of apparatus 104, e.g., transmitter 300 and receiver 304. At 502, apparatus 104 receives packet data on an uplink channel from a remote station, such as remote station 102 (see FIG. 2), and at 504 generates a first frame having a downlink dedicated physical channel, the first frame being defined by a first time offset relative to a reference timing based on a common control physical channel. At 506, apparatus 104 generates a second frame having a downlink dedicated control channel responsive to the received packet data, a beginning of the second frame being defined by a second time offset from the reference timing, the second time offset being a function of the first time offset. At 508, after transmitting common control physical channel in frame 606 in which the beginning of frame 606 establishes reference timing 608 (see FIG. 6), apparatus 104 transmits the first and second frames, in succession, to a remote station such as remote station 102, shown in FIG. 2.

With reference to FIG. 6, an exemplary relative timing of the downlink and uplink physical channels with the particular channels shown will be described with reference to a remote station or UE, such as remote station 102, and an apparatus for wireless communication, such as apparatus 104, in which case one example of apparatus 104 is a BS or base station, as depicted in FIG. 6. Remote station 102 transmits packet data 600 on an uplink channel to a base station which subsequently receives it as packet data 602 and processes the received packet data within a suitable BS processing time 604. Base station then transmits common control physical channel within a frame 606, the beginning of which establishes reference timing 608 for transmitting additional channels to the remote station as well as to other remote stations.

Continuing with FIG. 6, one such additional channel is a DPCH (Dedicated Physical Channel) channel within frame 618 which, in the embodiment shown in FIG. 6, has first time offset 620 of zero chips such that frame 618 is time aligned with the start of frame 606 having a P-CCPCH channel. First frame 624 having a DPCH channel is received by remote station 102 after a first propagation delay 623. A second additional channel transmitted by the base station to remote station 102 is a downlink dedicated control channel in frame 612, such as E-HICH, the beginning of which is defined by second time offset 610. As shown in FIG. 6, the transmission of frame 612 is such that the frame does not overlap with the BS_proc time 604 and UE_proc time 616. In such an E-HICH channel, an ACK or NAK signal is transmitted to remote station 102 indicating that the received packet data has been successfully decoded (ACK) or that the received packet data has not been successfully decoded (NAK). Remote station 102 receives the downlink dedicated control channel (e.g., E-HICH) in second frame 614 after a second propagation delay 613 and processes the information within a suitable UE processing time 616. If a NAK signal was received by remote station 102, then a retransmission of the packet data may be attempted by remote station 102. Additional DPCH channels in additional frames 622 (shown in dotted lines) defined by their respective second time offsets are transmitted to other respective remote stations served by the base station. In one embodiment, the DPCH channel may be a DPDCH channel (Dedicated Physical Data Channel).

Continuing with FIG. 6, in one embodiment, second time offset 610 is defined by the equation {Equation 1}, $\tau_{ec} = \tau_{ec0} + k(T_{ec})$ where k is a variable, and $T_{ec}$ and $\tau_{ec0}$ are both constants. In general terms, the variable k is a function of $\tau_{dpch}$ which is on figured by the network and may generally range from 0-10 ms, in steps of 256 chips. In order to ensure that the minimum processing time is available at the remote station, the transmission time of the DL (downlink) dedicated physical control channels related to E-DCH (Enhanced Dedicated Channel) or E-DPDCH (E-DCH Dedicated Physical Data Channel) may be such that their start or beginning of radio frame boundary occurs $\tau_{ec}$ chips later than the corresponding P-CCPCH start of radio frame boundary. $\tau_{ec}$ or second time offset may be computed as noted above with $T_{ec}$=30 and with k and $\tau_{ec0}$ set as defined in Table 1 (below) for the respective channels and TTI (transmission time interval) combinations. For cases where k can take multiple values, k, in one embodiment, may be computed as follows:

$$k = \left\lfloor \frac{TTI_{dpch} + 256 \cdot (\tau_{dpch} - \tau_{ec0}) - TTI_{e-hich} + T_{0\_min} - 256 \cdot \lfloor UE_{proc\_req}/256 \rfloor}{256 \cdot T_{ec}} \right\rfloor, \quad \text{(Equation 2)}$$

where $TTI_{dpch}$ is the transmission time interval of the DPCH channel, $TTI_{e-hich}$ is the transmission time interval of the E-HICH channel, $T_{o\_min}$ is a constant, and $UE_{proc\_req}$ is the processing time required for a given UE or remote station. Suitably, the value of $TTI_{dpch}$ may be 10 ms, the value of $TTI_{e-hich}$ may be 2 ms or 10 ms, the value of $T_{o\_min}$ may be 876 chips, and the value of $UE_{proc\_req}$ may be 3.5 ms. With the specific values selected for $\tau_{ec0}$ in relation to the E-HICH TTI, $T_{o\_min}$, and the UE processing time requirement, the computation of k may simply become:

$$k = \left\lfloor \frac{\tau_{dpch}}{T_{ec}} \right\rfloor, . \quad \text{(Equation 3)}$$

TABLE 1

| Channel | E-DCH TTI [ms] | $\tau_{ec0}$ chips | k |
|---|---|---|---|
| E-HICH E-RGCH (dedicated) | 10 | −7 | 0 … 5 |
| E-RGCH (common) | | | 0 |
| E-HICH E-RGCH (dedicated) | 2 | 113 | 0 … 5 |
| E-RGCH (common) | | | 0 |

Setting the timing as described above also ensures a one to one and unambiguous relationship between the P-CCPCH system frame number (SFN) and the dedicated downlink control channels (E-HICH and E-RGCH) radio frame boundaries and the uplink E-DPDCH radio frame boundaries. When E-DCH TTI is set to 2 ms, the relationship between sub-frames is straightforward since each radio frame is divided in 5 sub-frames, each sub-frame of a suitable duration such as 2 ms. This is turn simplifies the HARQ (Hybrid Automatic Repeat Request) association as follows. For 10 ms TTI E-DCH operation, the UE associates the HARQ ACK/NAK information received in radio frame with (Connection Frame Number) CFN=n with data transmitted in the UL (uplink) radio frame which corresponds to the DL radio frame with CFN=(n−N) mod $CFN_{max}$, where N is the number of HARQ processes. For 2 ms TTI E-DCH operation, the UE associates the HARQ ACK/NAK information received in sub-frame number s of the radio frame with CFN=n with data transmitted in the UL sub-frame which corresponds to the DL sub-frame (5n+s−N) mod 5 of DL radio frame with CFN=$\lfloor$(5n+s−N)/5$\rfloor$ mod $CFN_{max}$, where N is the number of HARQ processes. In FIG. 6, the N and the TTI in the "N*TTI" notation refers, respectively, to the number of HARQ processes and the transmission time interval of the E-DPDCH channel.

In another aspect of the present invention, a machine-readable medium comprising instructions, the instructions when executed by the machine, cause the machine to perform operations, is disclosed. The operations include transmitting packet data on an uplink channel, receiving a first frame having a downlink dedicated physical channel, the first frame being defined by a first propagation delay and a first time offset relative to a reference timing based on a common control physical channel, and receiving a second frame having a downlink dedicated control channel responsive to the packet data received by a base station, a beginning of the second frame being defined by a second propagation delay and a second time offset from the reference timing, the second time offset being a function of the first time offset.

In one embodiment, the machine-readable medium may be a disk based medium such as a CD-ROM. In one embodiment, the instructions may be executed within a remote station.

In another aspect of the present invention, an apparatus for a wireless communication system is disclosed. The apparatus includes means for receiving packet data on an uplink channel from a remote station, which may suitably include receiver 304 as shown, for example, in FIG. 3. The apparatus further includes means for generating a first frame having a downlink dedicated physical channel, the first frame being defined by a first time offset relative to a reference timing based on a common control physical channel and means for generating a second frame having a downlink dedicated control channel responsive to the received packet data, a beginning of the second frame being defined by a second time offset from the reference timing, the second time offset being a function of the first time offset. Such a means for generating a first frame and a second frame may suitably include control processor 302 as shown, for example, in FIG. 3.

In yet another aspect of the present invention, a remote station for wireless communication is disclosed. The remote station includes means for transmitting packet data on an uplink channel, which may suitably include transmitter 200 as shown, for example, in FIG. 2. The remote station further includes means for receiving a first frame having a downlink dedicated physical channel, the first frame being defined by a first propagation delay and a first time offset relative to a reference timing based on a common control physical channel and means for receiving a second frame having a downlink dedicated control channel responsive to the packet data received by a base station, a beginning of the second frame being defined by a second propagation delay and a second time offset from the reference timing, the second time offset being a function of the first time offset. Such a means for receiving a first frame and a second frame may suitably include receiver 204 as shown, for example, in FIG. 2.

In yet another aspect of the present invention, a machine-readable medium comprising instructions, the instructions when executed by the machine, cause the machine to perform operations, is disclosed. The operations include receiving packet data on an uplink channel from a remote station, generating a first frame having a downlink dedicated physical channel, the first frame being defined by a first time offset relative to a reference timing based on a common control physical channel, and generating a second frame having a downlink dedicated control channel responsive to the received packet data, a beginning of the second frame being defined by a second time offset from the reference timing, the second time offset being a function of the first time offset. In one embodiment, the machine-readable medium may be a disk based medium such as a CD-ROM. In one embodiment, the instructions may be executed within a base station or a base station controller.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A remote station for wireless communication, the remote station comprising:

a transmitter configured to transmit packet data on an uplink channel; and a receiver configured to:

receive a first frame having a downlink dedicated physical channel, the first frame being defined by a first propagation delay and a first time offset relative to a reference timing based on a common control physical channel; and receive a second frame having a downlink dedicated control channel responsive to the packet data received by a base station, a beginning of the second frame being defined by a second propagation delay and a second time offset from the reference timing, the second time offset being a function of the first time offset, wherein the second time offset is defined by the equation $\tau_{ec} = \tau_{ec0} + k(T_{ec})$ where k is a variable, $T_{ec}$ and $\tau_{ec0}$ are both constants.

2. The remote station of claim 1, wherein the variable k is a function of $\tau_{dpch}$ which is the first time offset.

3. The remote station of claim 2, wherein, $$k = \left\lfloor \frac{(TTI_{dpch} + 256 \cdot (\tau_{dpch} - \tau_{ec0}) - TTI_{e-hich} + T_{0\_min} - 256 \cdot |UE_{proc\_req}/256|}{256 \cdot T_{ec}} \right\rfloor.$$

4. An apparatus for a wireless communication system, the apparatus comprising:
a control processor configured to:
receive packet data on an uplink channel from a remote station;
generate a first frame having a downlink dedicated physical channel, the first frame being defined by a first time offset relative to a reference timing based on a common control physical channel; and
generate a second frame having a downlink dedicated control channel responsive to the received packet data, a beginning of the second frame being defined by a second time offset from the reference timing, the second time offset being a function of the first time offset, wherein the second time offset is defined by the equation $\tau_{ec}=\tau_{ec0}+k(T_{ec})$ where k is a variable, $T_{ec}$ and $\tau_{ec0}$ are both constants.

5. The apparatus of claim 4, wherein the variable k is a function of $\tau_{dpch}$ which is the first time offset.

6. The apparatus of claim 5, wherein, $$k = \left\lfloor \frac{(TTI_{dpch} + 256 \cdot (\tau_{dpch} - \tau_{ec0}) - TTI_{e-hich} + T_{0\_min} - 256 \cdot |UE_{proc\_req}/256|}{256 \cdot T_{ec}} \right\rfloor.$$

7. A method of operating a remote station for wireless communication, comprising:
transmitting packet data on an uplink channel;
receiving a first frame having a downlink dedicated physical channel, the first frame being defined by a first propagation delay and a first time offset relative to a reference timing based on a common control physical channel; and
receiving a second frame having a downlink dedicated control channel responsive to the packet data received by a base station, a beginning of the second frame being defined by a second propagation delay and a second time offset from the reference timing, the second time offset being a function of the first time offset, wherein the second time offset is defined by the equation $\tau_{ec}=\tau_{ec0}+k(T_{ec})$ where k is a variable, $T_{ec}$ and $\tau_{ec0}$ are both constants.

8. The method of claim 7, wherein the variable k is a function of $\tau_{dpch}$ which is the first time offset.

9. The method of claim 8, wherein, $$k = \left\lfloor \frac{(TTI_{dpch} + 256 \cdot (\tau_{dpch} - \tau_{ec0}) - TTI_{e-hich} + T_{0\_min} - 256 \cdot |UE_{proc\_req}/256|}{256 \cdot T_{ec}} \right\rfloor.$$

10. A method of operating an apparatus for a wireless communication system, comprising:
receiving packet data on an uplink channel from a remote station;
generating a first frame having a downlink dedicated physical channel, the first frame being defined by a first time offset relative to a reference timing based on a common control physical channel; and
generating a second frame having a downlink dedicated control channel responsive to the received packet data, a beginning of the second frame being defined by a second time offset from the reference timing, the second time offset being a function of the first time offset, wherein the second time offset is defined by the equation $\tau_{ec}=\tau_{ec0}+k(T_{ec})$ where k is a variable, $T_{ec}$ and $\tau_{ec0}$ are both constants.

11. The method of claim 10, wherein the variable k is a function of $\tau_{dpch}$ which is the first time offset.

12. The method of claim 11, wherein, $$k = \left\lfloor \frac{(TTI_{dpch} + 256 \cdot (\tau_{dpch} - \tau_{ec0}) - TTI_{e-hich} + T_{0\_min} - 256 \cdot |UE_{proc\_req}/256|}{256 \cdot T_{ec}} \right\rfloor.$$

13. A machine-readable medium comprising instructions, the instructions when executed by the machine, cause the machine to perform operations comprising:
transmitting packet data on an uplink channel;
receiving a first frame having a downlink dedicated physical channel, the first frame being defined by a first propagation delay and a first time offset relative to a reference timing based on a common control physical channel; and
receiving a second frame having a downlink dedicated control channel responsive to the packet data received by a base station, a beginning of the second frame being defined by a second propagation delay and a second time offset from the reference timing, the second time offset being a function of the first time offset, wherein the second time offset is defined by the equation $\tau_{ec}=\tau_{ec0}+k(T_{ec})$ where k is a variable, $T_{ec}$ and $\tau_{ec0}$ are both constants.

14. A remote station for wireless communication, comprising:
means for transmitting packet data on an uplink channel;
means for receiving a first frame having a downlink dedicated physical channel, the first frame being defined by a first propagation delay and a first time offset relative to a reference timing based on a common control physical channel; and
means for receiving a second frame having a downlink dedicated control channel responsive to the packet data received by a base station, a beginning of the second frame being defined by a second propagation delay and a second time offset from the reference timing, the second time offset being a function of the first time offset, wherein the second time offset is defined by the equation $\tau_{ec}=\tau_{ec0}+k(T_{ec})$ where k is a variable, $T_{ec}$ and $\tau_{ec0}$ are both constants.

15. The remote station of claim 14, wherein the variable k is a function of $\tau_{dpch}$ which is the first time offset.

16. The remote station of claim 14, wherein, $$k = \left\lfloor \frac{(TTI_{dpch} + 256 \cdot (\tau_{dpch} - \tau_{ec0}) - TTI_{e-hich} + T_{0\_min} - 256 \cdot |UE_{proc\_req}/256|}{256 \cdot T_{ec}} \right\rfloor.$$

17. An apparatus for a wireless communication system, the apparatus comprising:

means for receiving packet data on an uplink channel from a remote station;

means for generating a first frame having a downlink dedicated physical channel, the first frame being defined by a first time offset relative to a reference timing based on a common control physical channel; and means for generating a second frame having a downlink dedicated control channel responsive to the received packet data, a beginning of the second frame being defined by a second time offset from the reference timing, the second time offset being a function of the first time offset, wherein the second time offset is defined by the equation $\tau_{ec} = \tau_{ec0} + k(T_{ec})$ where k is a variable, $T_{ec}$ and $\tau_{ec0}$ are both constants.

18. The apparatus of claim 17, wherein the variable k is a function of $\tau_{dpch}$ which is the first time offset.

19. The apparatus of claim 18, wherein, $$k = \left\lfloor \frac{(TTI_{dpch} + 256 \cdot (\tau_{dpch} - \tau_{ec0}) - TTI_{e-hich} + T_{0\_min} - 256 \cdot \lfloor UE_{proc\_req}/256 \rfloor}{256 \cdot T_{ec}} \right\rfloor.$$

* * * * *

UNITED STATES PATENT AND TRADEMARK OFFICE
CERTIFICATE OF CORRECTION

PATENT NO. : 7,643,515 B2  Page 1 of 1
APPLICATION NO. : 11/266810
DATED : January 5, 2010
INVENTOR(S) : Serge D. Willenegger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 870 days.

Signed and Sealed this

Twenty-first Day of December, 2010

David J. Kappos
*Director of the United States Patent and Trademark Office*